V. M. DORSEY.
GLASS BLOWING MACHINE.
APPLICATION FILED FEB. 15, 1908. RENEWED MAY 31, 1912.

1,156,868.  Patented Oct. 12, 1915.
6 SHEETS—SHEET 1.

WITNESSES
J. Howard Bishop.
Golden Brown

INVENTOR
Vernon M. Dorsey

V. M. DORSEY.
GLASS BLOWING MACHINE.
APPLICATION FILED FEB. 15, 1908. RENEWED MAY 31, 1912.

1,156,868.

Patented Oct. 12, 1915.
6 SHEETS—SHEET 2.

WITNESSES
J. Howard Bishop
Golden Brown

INVENTOR
Vernon M. Dorsey

V. M. DORSEY.
GLASS BLOWING MACHINE.
APPLICATION FILED FEB. 15, 1908. RENEWED MAY 31, 1912.

1,156,868.

Patented Oct. 12, 1915.
6 SHEETS—SHEET 3.

WITNESSES
J. Howard Bishop.
Golden Brown.

INVENTOR
Vernon M. Dorsey

V. M. DORSEY.
GLASS BLOWING MACHINE.
APPLICATION FILED FEB. 15, 1908. RENEWED MAY 1912.

1,156,868.

Patented Oct. 12, 1915.
6 SHEETS—SHEET 6.

WITNESSES

INVENTOR

UNITED STATES PATENT OFFICE.

VERNON M. DORSEY, OF LAUREL GROVE, MARYLAND, ASSIGNOR TO EMPIRE MACHINE COMPANY, OF PORTLAND, MAINE, A CORPORATION OF MAINE.

GLASS-BLOWING MACHINE.

1,156,868.      Specification of Letters Patent.      Patented Oct. 12, 1915.

Application filed February 15, 1908, Serial No. 416,152. Renewed May 31, 1912. Serial No. 700,800.

*To all whom it may concern:*

Be it known that I, VERNON M. DORSEY, a citizen of the United States of America, and a resident of Laurel Grove, St. Marys county, State of Maryland, have invented certain new and useful Improvements in Glass-Blowing Machines, of which the following is a specification.

My invention relates to a machine for performing certain operations attendant upon the production of blown glass articles.

In the usual processes employed for the production of such articles, a suitable quantity of glass having been gathered upon the end of a blow-pipe, it receives a preliminary shaping by marvering or swinging, and is then inserted in a separable mold, (which is closed thereon,) and is blown while located within the mold by admitting air to the interior thereof, rotating being simultaneously imparted to the blow-pipe or mold in respect to each other for the purpose of eliminating the impression which would otherwise be made by the joint of the mold.

The machine forming the subject matter of this application is adapted to receive and support a blow-pipe upon which the glass has been properly gathered, and to thereafter perform the operation necessary for the proper manipulation of the mold, that is to say close it, wet it, and open it and to admit air from a suitable source to the blow-pipe and also to impart rotation to the blow-pipe in respect to the mold, these operations being performed either entirely automatically or needing only the initiation of the operator being subsequently carried out by the action of the machine.

In the specific form of apparatus which I have illustrated, the mold is normally open and held raised above a suitable water tank, and upon the operator having inserted the blow-pipe with the gathered glass thereon in a suitable rest, he then connects a suitable source of motive power with the several parts of the machine, whereby the mold will be closed, air admitted to the blow-pipe and the blow-pipe rotated, during a definite period, after which the mold will be opened, lowered in the bath and subsequently raised, at which time the parts will stop in the position which they had at the initiation of the operation, but with the article now fully formed upon the blow-pipe, which may then be removed, to be replaced by another pipe.

For this purpose, the machine comprises a non-traveling vertical movable separable mold, with means for closing and opening it while lifted and for lowering it and lifting it while opened and for maintaining it in its raised closed position during the proper blowing intervals and in its lowered open position during a proper cooling interval. It also comprises means for supporting a blow-pipe above the mold with means for rotating the blow-pipe in respect to the mold and for conducting air thereto, and a means for admitting air to the blow-pipe during predetermined parts of the cycle of the mold movements before described.

It further comprises means whereby the mold operating mechanism and the air mechanism will be normally maintained in a definite position, and whereby motion can be imparted to such mechanism for a definite period, after which the parts will be automatically restored to their normal position, without requiring the presence or action of an attendant except to initiate the movement of such parts, by which means the attendant after having placed the blow-pipe upon the rest and initiated the movement of the machine may leave it to automatically perform the succeeding operations.

The invention of this application therefore consists in various mechanisms and instrumentalities for effecting the aforesaid operations and their combination and arrangement, as will be hereinafter more fully described and claimed.

Referring to the accompanying drawings, in which corresponding parts are designated by corresponding marks of reference.

Figure 10:
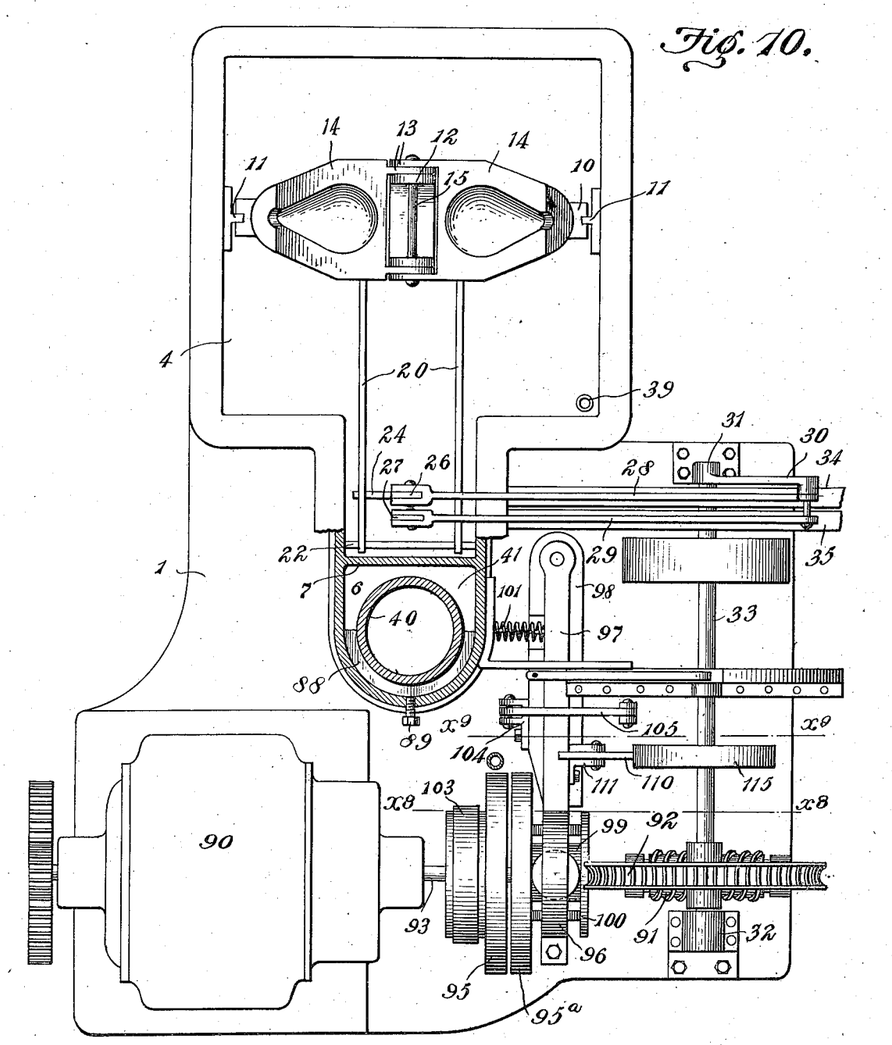
Fig. 10 is a section, showing the base of the machine in Fig. 1 in plan.

In these drawings, a machine is shown generally suitable for the manufacture of what is known as a No. 3 electric lamp bulb, the scale of Figs. 1 to 9 and 17 being 1 to 8: that of Fig. 10 being 1 to 4 and that of Figs. 11 to 16 being 1 to 2, and with a maximum output of 6 bulbs per minute, when the main-shaft is driven at the speed of one revolution in each ten seconds.

A suitable base upon which all the parts are mounted is provided and preferably consists of a table 1, provided with legs 2, and having a suitable recess 3 to receive a mold tank, comprising a body casting 4 and a well casting 5. The body casting has a rearward restricted portion 6, divided by a transverse partition wall 7. The part of the body casting between the front wall thereof and the partition 7 forms a mold receptacle, and has an aperture in its bottom beneath which is bolted the well casting. A guide spider 8 is inserted at the mouth of the well casting to serve as a guide for the lower end of the mold carrying plunger 9, the upper end of which is provided with a cross-head 10 running in guides 11 on the side walls of the body casting. The cross-head is provided on its upper surface and in front and behind the axial line of the plunger with an ear 12, through which and through webs 13 on the separate parts 14 of a two-part mold, a pivot pin 15 passes. The mold therefore opens sidewise. The webs on each half of the mold also receive a pin 16 located away from the pivotal point, to each of which pins is fastened the upper end of a link 17, which pass through apertures in the cross-head and the opposite ends of which are secured to lugs 18ª projecting from collar 18 movable upon the mold plunger. A second collar 19 is rigidly affixed to the plunger 9 beneath the collar 18 and each of these collars is slidingly connected to the front end of a pair of levers, viz., the mold closing levers 20 and the mold lifting levers 21, respectively, which have their rear ends pivoted upon pins 22 and 23, respectively, passing through the sides of the mold tank near the rear thereof at points intermediate of the top and bottom thereof. Each pair of the two pairs of levers is further connected, intermediate of their ends, by pins 24 and 25, respectively, attached to the lower end of links 26 and 27 respectively, the upper ends of which are pivotally attached to the ends of the tappet levers 28 and 29 respectively. The opposite ends of the tappet levers are carried by the projection 30 arising from a bearing 31 fastened to the table to one side of the mold tank. It will be seen that as the mold lifting tappet lever 29 is lifted the plunger attached thereto will be raised and thus the mold will be lifted, while if depressed the mold will drop into the tank. It will be further seen, if the collar 18 is raised in respect to the mold plunger, that the mold will be closed, whereas if it is lowered in respect thereto the mold will be opened, and that if it remains stationary in respect to the plunger the mold will remain open or closed as was its previous condition.

Figure 17:
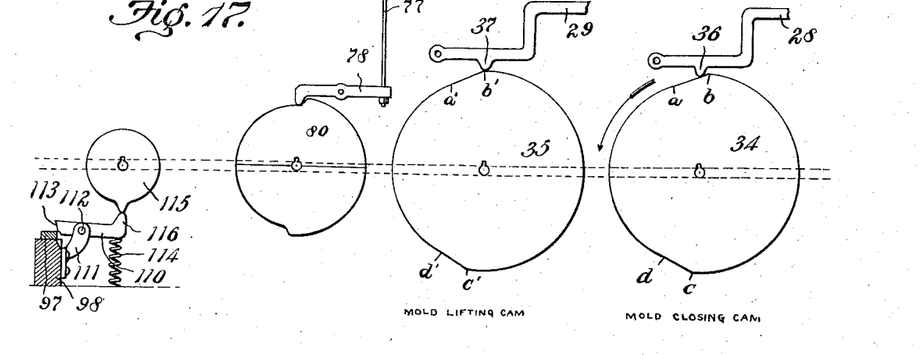
Fig. 17 is a view illustrating the several cams which are employed in the machine.

Mounted in the bearing 31 and in a corresponding bearing 32 at the rear of the table is the main-shaft 33, which carries near its forward end a mold closing cam 34 and the mold lifting cam 35, these cams being located beneath tappets 36 and 37 of the mold closing tappet lever 28 and mold lifting tappet lever 29 respectively. These cams are so shaped that during a certain portion of their revolution the two tappets, will be raised, the mold lifting tappet at its upper limit, and the mold closing tappet in an intermediate position and that subsequently thereto, the mold lifting tappet will be held stationary while the mold closing tappet is lifted, thus closing the molds, after which both tappets will be held in their raised position for a definite period, after which the mold closing tappet will be partly lowered, while the mold lifting tappet remains stationary, after which the two tappets will be lowered in unison, and finally will remain stationary at the lower limit of their movement until they are again lifted by a further revolution of the cams when the cycle before described will again take place. Cams suitable to effect this purpose are shown in Fig. 17 and in the specific embodiment herein shown, the lifting arc $a$—$b$ of the mold closing cam is 21 degrees, the lifted arc $b$—$c$ is 180°, the dropping arc $c$—$d$ is 21° and the depressed arc $d$—$a$ is 138°, while with the mold lifting cam the lifted arc $a'$—$b'$ and dropping arcs $c'$—$d'$ each measure 18°, the lifted arc $b'$—$c'$ 186° and the depressed arc $d'$—$a'$ 138°. With the shaft 33 driven at 6 revolutions per minute and with the tappets 36 and 37 on the tappet levers 28 and 29 in their position of rest shown in Figs. 1 and 17, that is to say with the tappet 36 on the mold-closing tappet lever 36 resting at a point 3° removed from $b$ (the junction of the lifting and lifted arcs) on the mold closing cam 34 and the tappet 37 on the mold lifting tappet resting on the mold lifting cam 35 at the point $b'$ (the junction of the lifted and lifting arcs) the molds will be raised and open. Upon the rotating shaft 33 and the cams carried thereon, in the direction of the arrows in the several figures the tappet 36 on the mold closing cam will run up the lifting arc $a$—$b$ to the point $b$, thus lifting the mold closing levers 20, the mold lifting levers remaining stationary during the time. Upon further rotation of the cams the tappets will be held at the upper limit of their movement (and thus the mold held up and closed) and will remain in this position until the point $c$ (the junction of the lifting and dropping arcs) on the mold-closing cams comes under the tappet 36 of the mold closing tappet lever, this representing the period of about 5 seconds. A further rotation of the cams will then drop the mold-closing tappet 36, which will be the only one so dropped until the points $c'$ (the junction of the lifted and dropping arcs) on the mold lifting cam comes beneath the tappet 37 on the mold-lifting tappet lever. During this last period, the mold will be opened and will be maintained at its raised position. During the succeeding movement of the cams through an arc of 18°, that is to say until the tappets 36 and 37 on the mold closing and mold lifting tappet levers, respectively, rest above the points $d$ and $d'$ (the junctions of the dropping and depressed arcs on the respective cams), the mold will be lowered but inasmuch as the two systems of levers are moving in unison, no change will take place in its open position, and it will then remain opened and at the bottom of its stroke within the tank until the further rotation of the cams through an arc of 138° brings the tappets 36 and 37 on the tappet levers above the points $a$ and $a'$ on the respective cams, that is to say above the junctions of the depressed and lifting arcs thereon, this taking about 4 seconds, during which the mold will be cooling.

Upon the further movement of the cams the tappets on the levers will be raised in unison, thus lifting the mold still open until the tappet 37 on the mold lifting tappet lever reaches the point $b'$ on the mold lifting cam, that is to say the junction of the lifting and lifted faces, at which time the mold will be fully raised but open and the several parts will have completed a full cycle of their operation.

Figures 1, 2, 3:
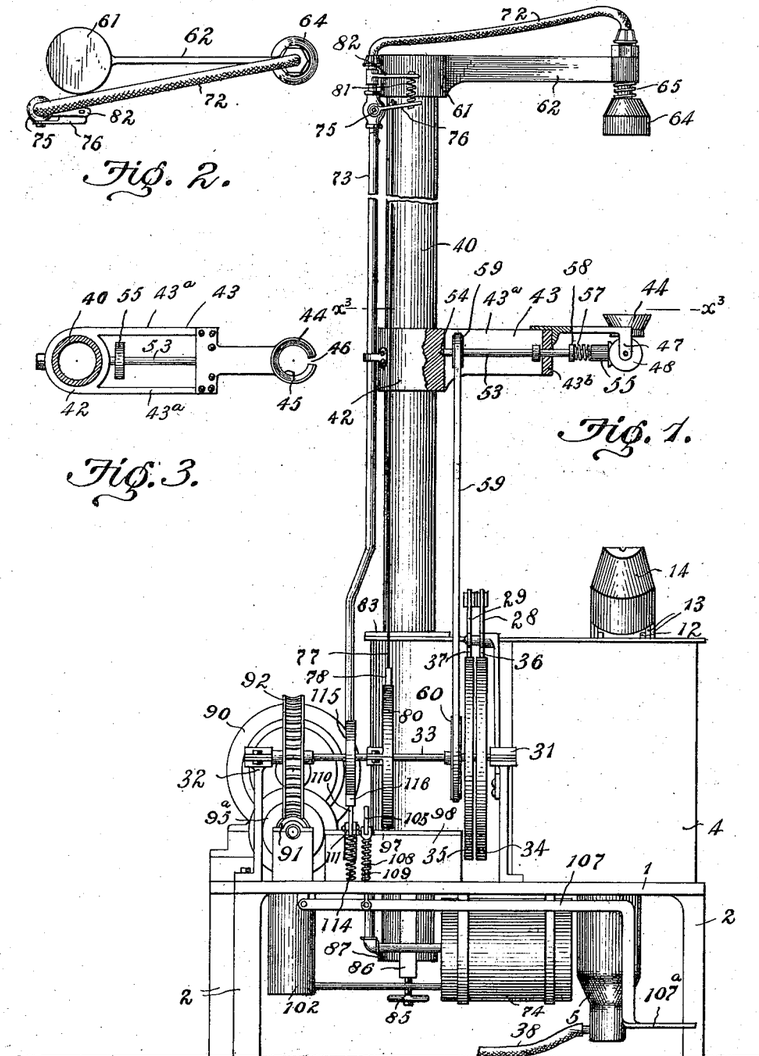
—Figure 1 is a side elevation of a machine constructed in accordance with this invention, viewed from the cam side, the parts being in normal position.
Fig. 2 is a plan view of the head thereof.
Fig. 3 is a section on lines $x^3$—$x^3$ thereof.
Figure 4:
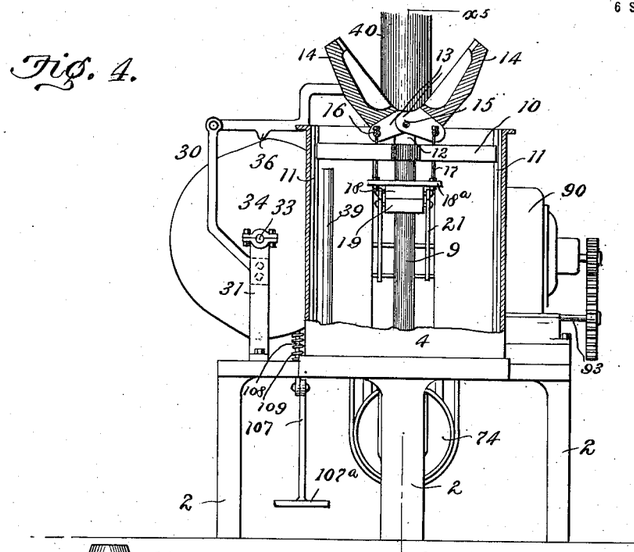
Fig. 4 is a front elevation of the lower part of the machine shown in Fig. 1, having the front of the tank broken away for the purpose of better illustration and with all parts in their normal position, that is to say with the mold up and open.
Figure 5:
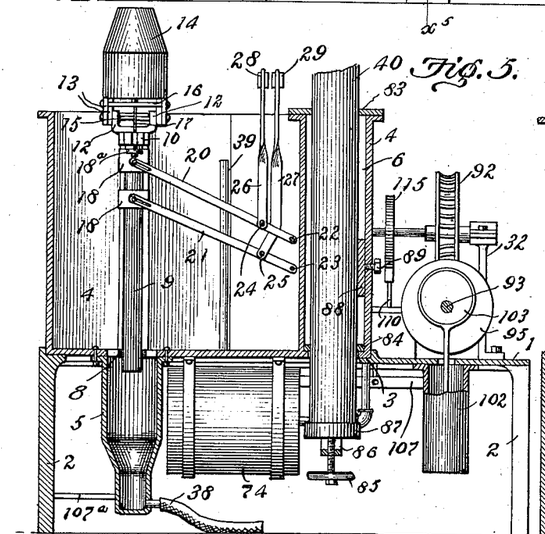
Fig. 5 is a central longitudinal section on the lines $x^5$ $x^5$ of Fig. 4, the mold in this figure being represented as up and closed.
Figure 6:
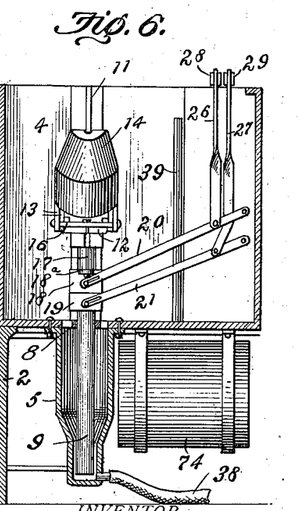
Fig. 6 is a fragmental view similar to Fig. 5 but showing the molds down and open.
Figure 7:
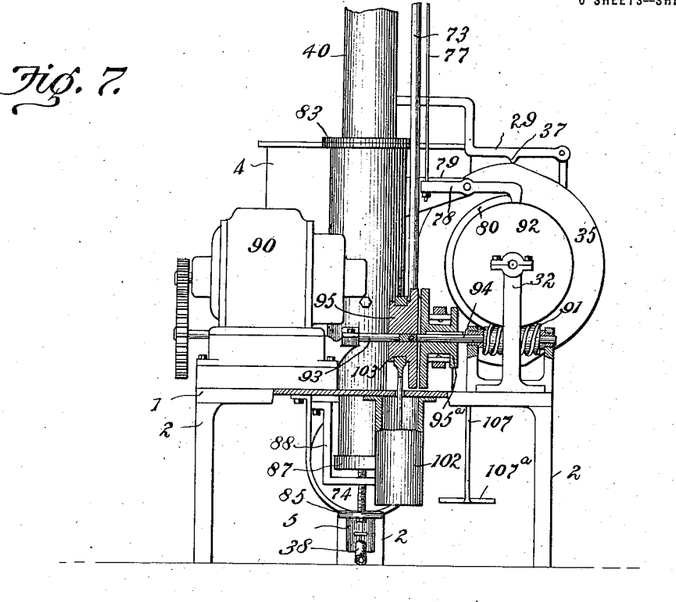
Fig. 7 is a rear elevation of the lower part of the machine shown in Fig. 1, partly in section.
Figure 8:
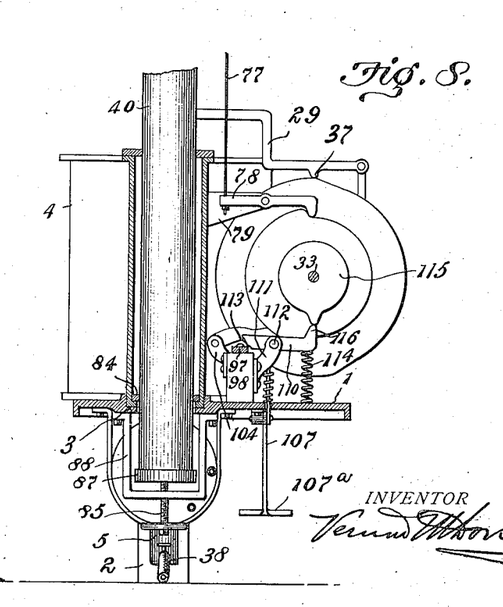
Fig. 8 is a vertical transverse section taken through the lower part of the machine on lines $x^8$—$x^8$ of Fig. 10.
Figure 9:
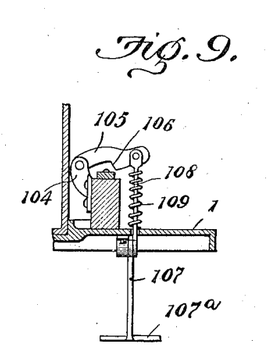
Fig. 9 is a fragmental section on lines $x^9$ $x^9$ of Fig. 10.

For the purpose of supplying cooling water to the mold tank, a supply pipe 38 discharges into the lower part of the well casting, while an exit pipe 39 is lead to near the top of the mold tank for the purpose of controlling the water level therein. By varying the rate of inflow it is obvious that the time of cooling of the mold may be regulated within certain limits and it will be further seen that by restricting the diameter of the mold well at the bottom to approximately the diameter of the plunger it is adapted to receive, (as shown in Fig. 6) the fall of the latter will be cushioned.

Figures 11, 12, 13, 14, 15, 16:
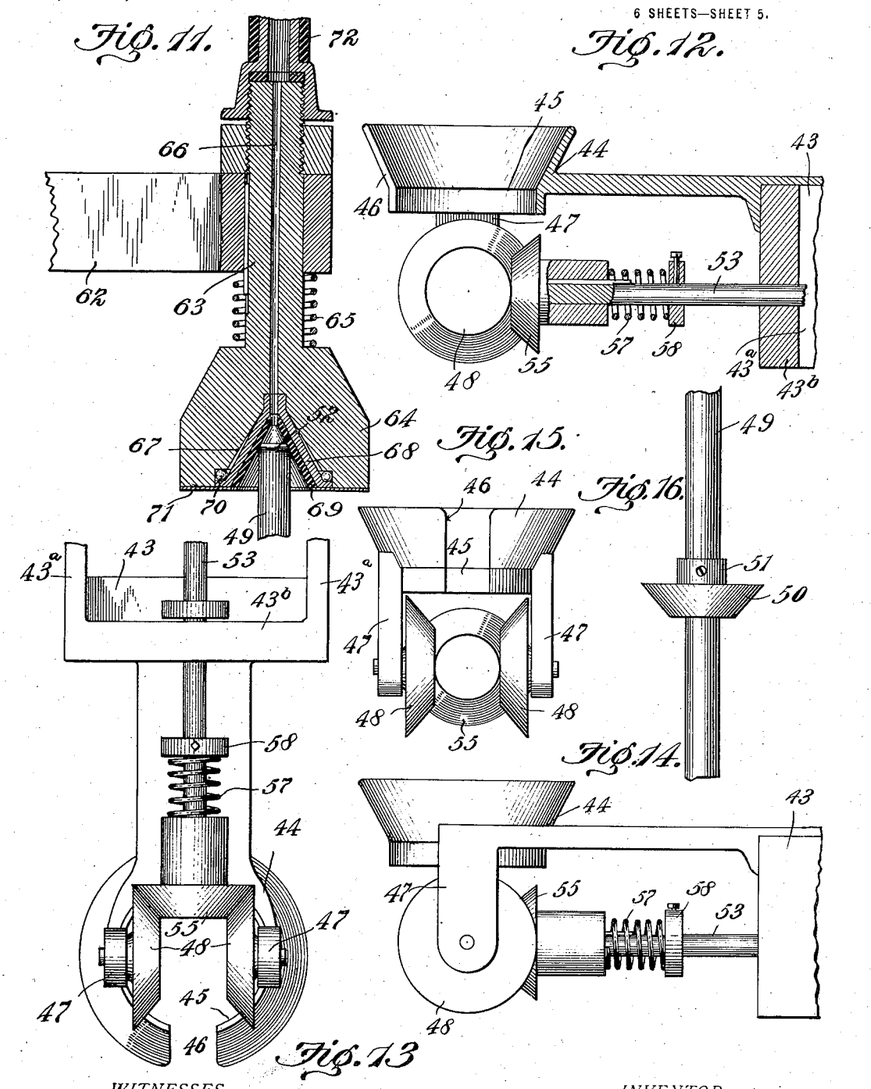
Fig. 11 is a vertical section through the chuck blocks, chuck and the supporting arm.
Fig. 12 is a longitudinal section through the blow-pipe rest showing the driving mechanism thereof.
Fig. 13 is an inverted plan of the rest shown in Fig. 12.
Fig. 14 is a side elevation thereof.
Fig. 15 is a front elevation of the rest.
Fig. 16 is a detail elevation of the blow-pipe showing the supporting flange thereon.

A standard 40, preferably hollow, arises from the rear end of the mold tank, its lower end passing through the cavity 41 formed between the transverse partition 7 and the rear wall thereof, and carries intermediate of its height an adjustable collar 42, from which projects a forwardly extended arm 43. The forward end of this arm carries a rest, in the form of a socket casting 44 which has in its forward end a vertical bore 45 concentrically placed with the axis of the mold and opening to the front of the casting by a vertical slot 46. The upper part of this bore is conical to serve as a guide for the flange upon the blow-pipe, and the casting has projecting downwardly therefrom on each side of the axial line of the mold, an ear 47, forming a bearing in which is mounted a conical pulley 48, the two pulleys being adapted to support a blow-pipe 49 by means of a conical flange 50, on the latter. This flange may, as shown in Fig. 16 be formed upon a collar 51 adjustably clamped upon the blow-pipe intermediate of its ends, the upper end of the pipe being coned as at 52 (Fig. 11) to fit the air chuck to be hereinafter described.

The projecting arm 43 consists of two sides 43$^a$ united by a front web 43$^b$, and in such web a shaft 53 is mounted, the rear end of the shaft taking into a socket 54 in the collar 42. The forward end of the shaft projects to a point adjacent to and between the supporting pulleys 48, where it receives a cone driving pulley 55, which is splined upon the said shaft, and which is projected toward the axial line of the mold and thus between the pulleys 48, by means of a spring 57 interposed between the hub of the driving pulley and a collar 58 upon the shaft 53, the shaft being driven by a chain or belt 59$^a$ passing over a pinion 59 thereon and over a wheel 60 located upon the main shaft.

At the upper end of a standard is mounted a cap 61 having a forwardly projecting arm 62 which is vertically apertured in the axial line of the mold, and receives the stem 63 of a chuck block 64 which is splined therein in order to prevent rotation. The block is normally pressed downwardly by means of a spring 65, the block and its stem being centrally bored as at 66, the lower end of the said bore terminating in a conical enlargement 67 in which is contained the cone chuck 68, the inner face of which is packed with rubber or other suitable material 69. Balls 70 are interposed between the cone and the block and the cone is held in place within the block by means of a face plate 71 secured to the lower end of the block.

The upper end of the block stem is provided with a suitable coupling to receive a flexible hose 72 by which it is connected to a vertical air pipe 73, which has its lower end connected with an air tank 74 located, by preference beneath the table. An air valve 75 is located in the vertical pipe near the top thereof, and has the arm thereof connected by the rod 77 with the inner end of a lever 78 pivoted in a bracket 79 to one side of the tank casting, the outer end of the lever resting upon a suitable cam 80, fastened upon the main shaft 33. The valve is normally held closed by a spring 81 tensioned between the arm 76 and a projection 82 carried by the pipe and is opened at proper times by the cam, the contour of which is such as to cause the air to be admitted in quantities and at times demanded by the article being blown.

The standard 40 is guided by a collar 83 secured to the top of the rear of the tank casting above the cavity 41 therein, and by a washer 84 located in the lower end of the said cavity above the bottom thereof, and can be raised or lowered by means of a jack 85 carried by a stirrup 86 hung from the bottom of the table below the said cavity, a cap 87 being upon the lower end of the standard to receive the thrust of the jack. The standard is further locked in place when adjusted in height to conform to the length of the blow-pipe used by means of a saddle block 88 located in the cavity and pressed against the standard by a set screw 89 projecting through the rear wall of the tank casting.

Upon the rear of the table 1 is mounted a suitable motor 90, by preference electric, which drives by means of a worm 91 and a worm wheel 92, the main shaft 33 upon which the last named wheel is mounted. The cross-shaft forming the connection between the motor and worm is formed by two parts 93 and 94 adapted to be mechanically connected by means of a clutch, consisting of the two parts 95 and 95$^a$, the former of which is secured upon the part 93 of the cross-shaft, while the latter is splined upon the part 94 of said shaft, which carries the worm, and is adapted to be moved thereon into and out of engagement with the part 95 of the clutch by means of the yoke 96 having an arm 97 pivoted at its forward end to a block 98 upon the table. The yoke surrounds the part 95$^a$ of the clutch and is located in a groove 99 therein, and carries rollers 100 to reduce friction.

The clutch is normally held in its open position by a coiled spring 101 located between the arm 97 and the side of the mold tank. A suitable pump 102, actuated by the eccentric 103 formed upon the hub of the clutch part 95, feeds air to the air tank 74 and is hung beneath the rear of the table.

A bracket 104, fastened to the block 98 and intermediate of the ends of the yoke arm and between it and the tank, serves as a pivot for a cam lever 105, which has a cam face 106 so located and shaped that with the clutch open, upon the depression of the free end of this lever, the cam face will engage the outer side of the yoke arm, and by sliding thereon will swing it toward the center of the machine, thus engaging the clutch. To permit this depression of the cam lever, a foot lever 107, which projects to the front of the table and there forms a pedal 107$^a$, is pivoted beneath the table near the rear thereof and is connected by a link 108 with the free end of the said cam lever, it being normally held in its raised position by means of a spring 109 surrounding the said link and interposed between the table and the end of the said cam lever, which thus forms the actuating lever for the clutch.

A second cam lever 110 is pivoted in a bracket 111 secured to the outer side of the block 98 and is adjacent to the clutch actuating lever, its pivot 112 being intermediate of its ends. Its inner end is slightly beveled as at 113 so that when depressed, after the arm has been moved toward the center line of the machine, it falls upon the outside thereof and will on a further depression tend to press the yoke arm more toward the center of the machine, thus the more firmly engaging the clutch members and locking the clutch. The depression of the cam end of this locking cam lever is effected by a spring 114 interposed between its opposite end and the table, and is controlled by an unlocking tappet wheel or cam 115 located upon the main shaft 33, upon which wheel a tappet 116 upon the last named end of the said lever rests. The wheel 115 is so shaped that when the mold is in its raised position or open, the tappet portion of the cam will lie above the tappet 116 on the locking lever, while in any other position, a cut away part of the said wheel will lie above the said tappet.

The operation of a machine organized as above described with the parts in position shown in Figs. 1, 4, 7, 8 and 10 is as follows: The operator having gathered a suitable mass of glass upon a blow-pipe and having given it such preliminary treatment as is usually given glass in hand blowing prior to its introduction into the mold, inserts the upper end of the blow-pipe in the air chuck, and by means of the blow-pipe raises it so as to permit the flange of the blow-pipe to be above the rim of the socket of the center rest. He then inserts the blow-pipe beneath the flange thereon through the slot in the socket and releases the blow-pipe which then descends until the flange bears upon the supporting pulleys forming a part of the rest. Upon now depressing the forward end of the foot lever, he, by means of the actuating cam 105, forces the yoke arm toward the center line of the machine and thus throws in the clutch, whereupon the main shaft will be given movement. The initial movement of the shaft by means of the cam closing lever closes the mold, and furthermore carries the tappet portion of the unlocking cam 115 from over the tappet 116 on the end of the locking lever 110, thus releasing the spring 114 to force the opposite end of the said lever down past the yoke arm, thus locking the clutch in engagement. He can now remove his foot and the machine will complete its cycle of operation. The blow-pipe will be rotated by means, in the structure shown, of the shaft 53, driving gear 59a—59 and 60, driving pulley 55 and the supporting pulleys 48 upon which the blow-pipe flange rests. The initial movement of the shaft 33 after the closing of the mold effects no change in the mold, but at the proper period the descending arc of the mold closing cam will permit the mold to open and then in connection with the descending arc of the mold lifting cam will permit the mold to descend into the mold tank where it will be cooled during the succeeding part of the rotation of the shaft and until the tappets upon the mold closing and mold lifting mechanisms engage the ascending arcs of the said cams and raise the mold, still open, to its lifted position, at which time the tappet part of the locking cam will engage the tappet 116 upon the end of the locking lever 110 and depresses that end thereof, thus raising the yoke arm engaging end and releasing the said arm and permitting the spring 101 to open and disengages the clutch, when the parts will stop in their normal position. The blow-pipe with its completed article may now be removed and a new pipe with its gathering of glass thereon inserted and the operation before described repeated. It will be seen that by this construction the blower or gatherer may after inserting the blow-pipe within the machine, leave the machine and proceed with the gathering of a fresh batch, leaving the completed article to be removed by another employee. As the time for gathering is much greater than the time for blowing and cooling, a single machine will be able to perform the blowing of a number of gatherers, whose output will be increased by the time necessary, in hand blowing, for the blowing period.

Figure 18:
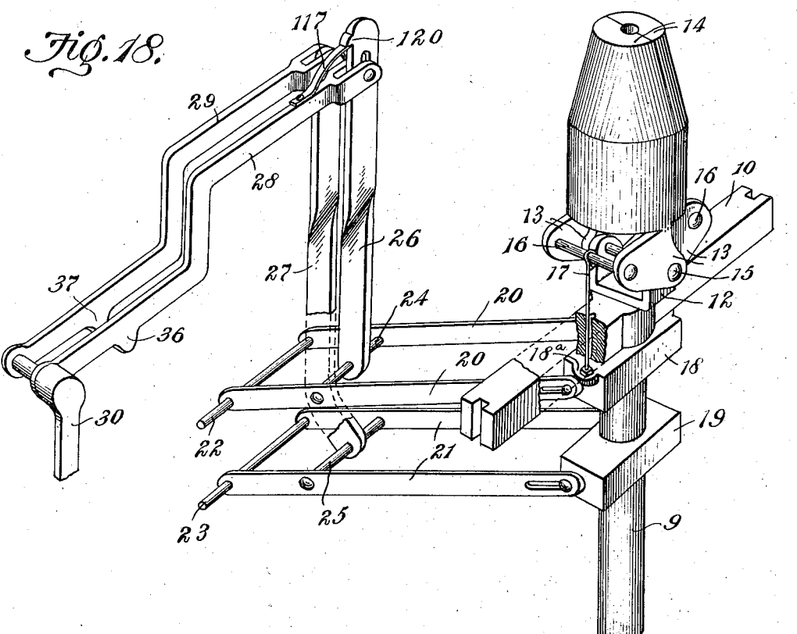
Fig. 18 is a perspective showing of the mold operating mechanism.

In order to avoid accurate fitting which might, unless present, result in the shearing or breaking of the connection between the mold closing tappet 28 and the mold closing collar, I may, if I so desire, and as is shown in Fig. 18, make the connection between the link 28 and collar by a resilient part through which the motion of the one is transmitted to the other. This, as shown in said figures, consists in a spring 117 secured to the mold closing tappet 28 and engaging an ear 120 on the link 26, so that the link will be lifted by the spring which will give and accommodate itself to the inaccuracies of adjustment or construction of the parts and will close the mold with certainty without undue strain upon the parts.

It will be noted that the mold closing mechanism comprising the links 17, collar 18, and levers 21, has a support in the machine frame at 22, which support is independent of the mold-lifting plunger and does not vary with the lifting and lowering motions thereof. Thus the mold closer is mounted independently of mold lifter, but is carried as a whole thereby. Hence the necessity in the construction shown of the movement of the mold-closing mechanism simultaneously with the mold lifter if the position of the mold parts is to remain unaltered during the movement of the mold lifter.

Inasmuch as the claims of this application are, under the requirements of the Office restricted to mold-operating means, I do not by failure to claim other features shown herein, and which may be also shown in my other application filed of even date herewith, and serially numbered 416,152, and renewed Dec. 30, 1911, as Sr. No. 668,762, abandon the same.

Having thus described my invention, what I claim and desire to secure by Letters Patent is:—

1. In a mold lifting and closing mechanism for a glass blowing machine, the combination with a vertically movable separable mold, of mechanism for lifting the mold, mechanism for closing the mold having a support independent of the movement of the mold lifting mechanism, means for simultaneously actuating the mold lifting and mold closing mechanisms and for independently imparting a further movement to the mold closing mechanism while the mold lifting mechanism remains stationary, substantially as described.

2. In a mold closing and lifting mechanism for a glass blowing machine, the combination of a plunger, a separable mold carried on the plunger, means for lifting and lowering the plunger, a collar movable on the plunger and connected with the mold to close it, means for moving the plunger and means having a support independent of the movement of the plunger for imparting motion to the collar simultaneously with the movement of the plunger and for then moving the collar on the plunger, substantially as described.

3. In a mold lifting and closing mechanism for a glass blowing machine, the combination with a mold tank, of a plunger, having a cross-head thereon, a guide for the plunger and guides for the cross-head located in the tank, a separable mold mounted upon the cross-head, a collar mounted upon the plunger and connected with the parts of the molds and means having a support independent of the movement of the plunger for simultaneously moving the collar and plunger and for imparting independent motion to the collar upon the plunger, substantially as described.

4. In a mold lifting and closing mechanism for a glass blowing machine, the combination of a mold tank, having a well in the bottom thereof, a plunger fitting within the well and projecting into the tank and forming with the well a dash pot, means for moving the plunger, a separable mold carried on the plunger and means for opening and closing the mold, substantially as described.

5. In a mold lifting and closing mechanism for a glass blowing machine, the combination with a mold tank, having guides therein, and a well located at the bottom of the tank, of a plunger within the well and forming therewith a dash pot, a cross-head upon the plunger engaging the guides within the tank, a separable mold located on the cross-head, a collar movable upon the plunger and connected with the mold sections, levers pivoted within the tank connected with the plunger and with the collar thereon and means for simultaneously lifting the levers and for independently imparting further movement to the lever actuating the collar, substantially as described.

6. In a mold lifting and mold closing mechanism for a glass blowing machine, the combination with a separable mold, of mechanism for lifting the mold and for opening it, cams adapted when moved to actuate the said mechanism in a predetermined order simultaneously and independently, and means for driving the said cams, substantially as described.

7. The combination with a mold-carrier and mold sections carried thereby, of an actuator, and means actuated thereby for raising said molds to a position to receive the material to be molded and, while in said position for closing said molds, and to then open said molds and drop the same, said means comprising cams driven by said actuator and being of different contour, levers in operative engagement with the said cams respectively, and operative connections between said levers, respectively, and said mold-carrier and said mold sections, the said levers being simultaneously actuated by said cams, and one of said levers being also independently operable thereby, respectively.

8. The combination with a mold-carrier, of mold sections carried thereby, a lever, operative connections between said lever and said mold sections, whereby the rocking of said lever will alternately open and close said mold sections, a second lever, operative connections between said second lever and said mold-carrier, whereby the rocking of said second levers will alternately raise and lower said mold-carrier, and means for operating said levers simultaneously and the first lever independently, said means comprising cams of different contour, said levers being in operative engagement with said cams, respectively, and means for actuating said cams.

9. In a glass blowing machine, the combination with a mold-carrier and mold sections carried thereby, of means for lifting the mold-carrier, means for closing the mold sections thereon, and an actuator for the mold-raising and mold-closing means so constructed and arranged that the mold-closing means and the mold-raising means are simultaneously actuated, and then further movement is given to the mold-closing means alone.

10. In a glass blowing machine, the combination with a mold-carrier and mold sections carried thereby, of a lever for lifting the carrier, a lever pivotally supported independently of the carrier for closing the mold parts carried by the carrier, and an actuator for simultaneously actuating both levers and to raise the mold carrier without changing the position of the mold parts thereon and for then giving further movement to the mold-closing lever.

11. In a glass blowing machine, the combination with a mold-carrier and mold sections carried thereon, of links for closing the mold parts on the carrier, an actuator, a connection between the carrier and the actuator, and an independent connection between the links and the actuator, said connections comprising cams driven by the actuator and of dissimilar contour to cause similar and then dissimilar movement of the actuator and mold-closing links.

12. In a glass blowing machine, the combination with a mold-carrier and mold sections carried thereby, of links for closing the mold parts, a mold-lifting lever connected to the carrier, a mold-closing lever connected to the links, cams of dissimilar contour for simultaneously actuating the levers and for independently actuating the closing lever, and a common actuator for the cams.

VERNON M. DORSEY.

Witnesses:
GOLDEN BROWN,
J. HOWARD BISHOP.